United States Patent [19]

Blach

[11] 4,073,013
[45] Feb. 7, 1978

[54] SCREW MACHINE FOR HOMOGENIZING MATERIALS OF SOLID, LIQUID AND PASTY CONSISTENCY

[76] Inventor: Josef A. Blach, Sucystrasse 24, D 7210 Bietigheim, Germany

[21] Appl. No.: 740,107

[22] Filed: Nov. 9, 1976

[30] Foreign Application Priority Data

Nov. 13, 1975 Germany .............................. 2550969

[51] Int. Cl.² ............................................... B29B 1/10
[52] U.S. Cl. .................................... 366/83; 366/301; 366/319
[58] Field of Search ................. 259/191, 192, 193, 97, 259/5, 6, 21, 40, 41; 425/207, 208, 376; 100/150

[56] References Cited

U.S. PATENT DOCUMENTS

| 2,200,997 | 5/1940 | Royle | 259/191 |
| 3,779,522 | 12/1973 | Loomans | 259/192 |
| 3,884,451 | 5/1973 | Stenmark | 259/191 |

Primary Examiner—Robert W. Jenkins
Attorney, Agent, or Firm—Kenway & Jenney

[57] ABSTRACT

A screw machine for homogenizing materials of solid, liquid and pasty consistency, said screw machine having at least two engaging screw shafts, each of which is provided with at least one screw section and one core shaft section, on which at least one annular disc whose shape differs from a circular cylinder concentric to the shaft axis is mounted, said annular disc be adapted to be non-rotatably connected to the core shaft section at least against the operational direction of rotation of the screw shaft, and the angular position of said annular disc being adjustable in relation to the core shaft section.

15 Claims, 13 Drawing Figures

SCREW MACHINE FOR HOMOGENIZING MATERIALS OF SOLID, LIQUID AND PASTY CONSISTENCY

BACKGROUND OF THE INVENTION

This invention relates in general to screw machines for homogenizing materials of solid, liquid and pasty consistency and more specifically to homogenizing screw machines having engaging screw shafts that have screw sections and core shaft sections that mount at least one disc.

By the term homogenizing all those processes are meant hereinafter by means of which the macro- or microstructure of masses having one or several components is made more uniform, i.e. especially the processes of mixing, kneading, dispersing, emulsifying, plasticizing and the like.

Screw machines having several screw shafts of the aforesaid kind which mesh with one another and are driven in the same or opposite direction are known for processing plastics and other materials. Normally on the screw shafts of these machines several cylindrical (not circular cylindrical) annular discs are mounted alongside one another and separated from one another by means of intermediate annular discs on a core shaft section, which is contained between two screw sections serving to convey the material to be processed, said screw sections being non-rotatably connected to the core shaft section. The intermediate annular discs are necessary, since the cylindrical annular discs of screw shafts meshing with one another must be prevented from rubbing against one another as a result of uneven temperature conditions or manufacturing inaccuracies of the two screw shafts.

In the known screw machines of the type described at the beginning the annular discs of the screw shafts are safeguarded from rotating relative to the respective core shaft section in that the latter is provided with several longitudinal grooves spaced along its periphery, in which corresponding keys or internal keys of the annular discs engage. At least one of the screw sections adjacent the set of annular discs can be removed, so that it is possible to remove the annular discs from the core shaft section and replace them on the core shaft section rotated in relation to the latter and in relation to one another. By means of corresponding choice of the angular positions of the various annular discs in relation to one another and to the adjacent screw sections the duration of the stay of the material to be processed in the homogenizing zone of the screw shaft formed by the set of annular discs and the energy which is introduced in this homogenizing zone into the material to be processed can be altered and predetermined. The disadvantage in the known screw shafts constructed in the above described manner is that they must be removed from the machine in order to alter the angular positions of the annular discs, which is bothersome and time consuming, since drive means and mounting of such screw shafts must be in a position to receive and transfer considerable forces and torques and are thus constructed in such a way as to prevent simple and quick removal and installation of the screw shafts. However, since both the energy consumption and said duration of the stay should be very different depending on the product, task and process, it is desirable in order to make optimum use of the machine, energy and product that the geometry of the screw shafts be adapted to the respective requirements, which is, of course, only be carried out if this adaptation can be effected relatively quickly and simply.

A further disadvantage of the above described, known screw machines is that the design of the required intermediate annular discs depends on the respectively chosen relative angular position of adjacent annular discs if an abutting of the intermediate annular discs of a screw shaft against the annular discs of the screw shaft located opposite is to be excluded, and gaps and therefore dead zones between inactive surfaces of adjacent annular discs are to be avoided—for example, in such dead zones delicate plastics can be thermically damaged owing to the prolonged duration of the stay, and furthermore, they make the cleaning of the screw shafts more difficult when the material is being changed. Thus, the most varied shapes of intermediate annular discs are required for the known screw machines. The object of the invention was to improve the screw shafts of a screw machine of the type described at the beginning in such a way that their removal from the machine for the purpose of altering the angular position of one or several annular discs is no longer necessary. This object is fulfilled according to the invention in that the annular disc on the core shaft section of the respective screw shaft is rotatable at least in the operational direction of rotation of this screw shaft—since screw shafts for the aforesaid purposes always rotate only in a direction determined by the construction, it is adequate to ensure that the annular disc is carried along in this direction, i.e. in normal operation cannot be rotated in relation to the adjacent screw sections in a direction opposite to the operational direction of rotation. One can then readily design the construction in such a way that the annular disc can be rotated and adjusted in the operational direction of rotation of the screw shaft, i.e., in the sense of a lead, in relation to the adjacent screw section, without the screw shaft having to be removed from the machine for this purpose. Of course, the annular disc does not have to be continuously rotatable through a full 360°, it is sufficient for it to be displacable in certain angular steps in relation to the core shaft section. If the annular discs were now mounted in the manner known per se on the core shaft section with interposed intermediate annular discs, rotation of the annular discs would result in the occurence of dead zones between adjacent annular discs and the abutting of annular and intermediate annular discs of screw shafts located opposite one another, so that under certain circumstances the screw shafts might indeed have to be removed, particularly for cleaning purposes when the material is being changed. Thus in accordance with the invention it is further suggested that the radially overlapping annular discs of the engaging screw shafts be designed in such a way that they are provided with peripheral zones of decreased width in the overlapping region. More particularly, the annular discs should be of decreased width starting at a certain diameter, which is slightly smaller than the axial distance (practical axial distance) between the two engaging screw shafts. One can then avoid the use of intermediate discs without having to tolerate gaps and dead zones between inactive surfaces of the annular discs and the abutting of annular and intermediate annular discs of screw shafts located opposite one another Consequently, it is no longer necessary to remove the screw shafts from the screw machine.

The annular discs could be of decreased width in the peripheral zone by, for example, providing them with a triangular profile. One could also consider decreasing the width by means of a reduction at one endface only of the annular disc. However, in a preferred embodiment of the invention both sides of the annular discs are provided with shoulders in the peripheral zones thereby decreasing the width of the annular discs in this peripheral zones.

The energy introduced in a homogenizing zone to the material to be processed depends among other things on the width of the gaps between the active surfaces of annular discs meshing with one another. In order to enable easy adaptation to desired operational conditions, it is suggested in accordance with the invention that the peripheral zones of decreased width be formed by exchangeable parts. Therefore the width of the gap can be altered without removing the screw shafts, namely by opening the machine housing which is separated in a manner known per se, in order to make the annular discs accessible, whereupon the parts forming the peripheral zones of decreased width can be exchanged.

For the purpose of readjusting the annular disc or annular discs of a screw shaft the machine housing surrounding the screw shaft can, for example, be provided with an opening or can be divided in a manner known per se and designed to be pulled apart, it is, however, also possible to provide a hollow core shaft for the screw shaft and adjust the annular disc or annular discs via the core shaft cavity. Since the action of the apparatus can be changed from non feeding mode to axial forward or backward feeding mode by altering only the angle of displacement of an annular disc in relation to adjacent screw sections and/or the angle of displacement of the annular discs of a set of annular discs in relation to one another, and the duration of the stay of the material in the homogenizing zone and the amount of the energy introduced in the homogenizing zone per unit of time can thereby be preselected, the invention makes it possible to optimize the function of a screw machine in a controlled manner, e.g. by computer control, since it is no longer necessary to remove the screw shaft in order to adapt the function of the homogenizing zone to the material to be processed.

The annular discs can have any cross section differing from a circle concentric to the center of the core shaft section, but preferably they have the shape of sections of a screw. Moreover, discs which do not form a complete closed ring can, of course, also be used instead of closed annular discs.

In a first particularly advantageous embodiment of a screw shaft for a screw machine according to the invention the core shaft section is provided over its circumference with several longitudinal extending, spaced notches, in which engages at least one stop element of the annular disc being adjustable in radial direction. This stop element can be, for example, a screw bolt which is screwed through the annular disc from the outside and engages in one of the notches of the core shaft section. In order to provide for easier adjustment of the annular disc it is recommended that the core shaft section be provided with a saw tooth profile along its circumference, so that the stop element can be designed as a bolt sprung in radial direction, namely biased in a direction towards the core shaft section, and guided in the annular disc, and that the annular disc can be rotated in one direction on the core shaft section whilst it is carried along in the other direction of rotation of the screw shaft by the saw teeth of the core shaft section.

In another particularly advantageous embodiment the annular disc is clamped in axial direction between adjacent parts of the screw shaft and at least its one endface and the adjacent endface of the adjoining part have a profile extending preferably in a radial direction. If the core shaft has several annular discs, the endfaces of all these annular discs and the front sides of the screw sections facing the set of annular discs have a profile as described above, so that by shifting the screw sections in an axial direction, namely in a direction towards the set of annular discs, the annular discs can be non rotatably coupled with the screw sections, while they can be freely rotated relative to the core shaft section when the screw sections are pulled apart.

In a third, particularly preferred embodiment the annular disc is mounted on a well known annular clamping spring, which is adapted to be clamped in axial direction between parts non rotatably mounted at the screw shaft. In a set of annular discs all the annular discs are mounted on annular clamping springs well known in the art, so that when the screw sections are pulled together in a direction towards the set of annular discs the annular clamping springs are clamped in an axial direction and thereby expand in a radial direction, so that they couple the annular discs with the core shaft section by means of a frictional connection.

Finally, a further embodiment comprises a hollow core shaft section with a window, through which a pinion adjustable and lockable in relation to the screw shaft projects and engages in an internal toothing or the like of the annular disc. If, for example, the pinion is attached to an axis extending to one end of the screw shaft, the annular disc can be adjusted and locked from the end of the screw shaft.

Further features, advantages and details of the invention are disclosed in the enclosed claims, the following description and the enclosed drawings of various, preferred embodiments of screw machines in accordance with the invention.

FIG. 4b is a section of the screw shaft taken along the line 4b—4b shown in FIG. 4a;

FIG. 5a is an illustration of a second embodiment of a screw shaft corresponding to FIG. 4a;

FIG. 8a is an illustration of a fifth embodiment corresponding to FIG. 4a, and

Figure 1:
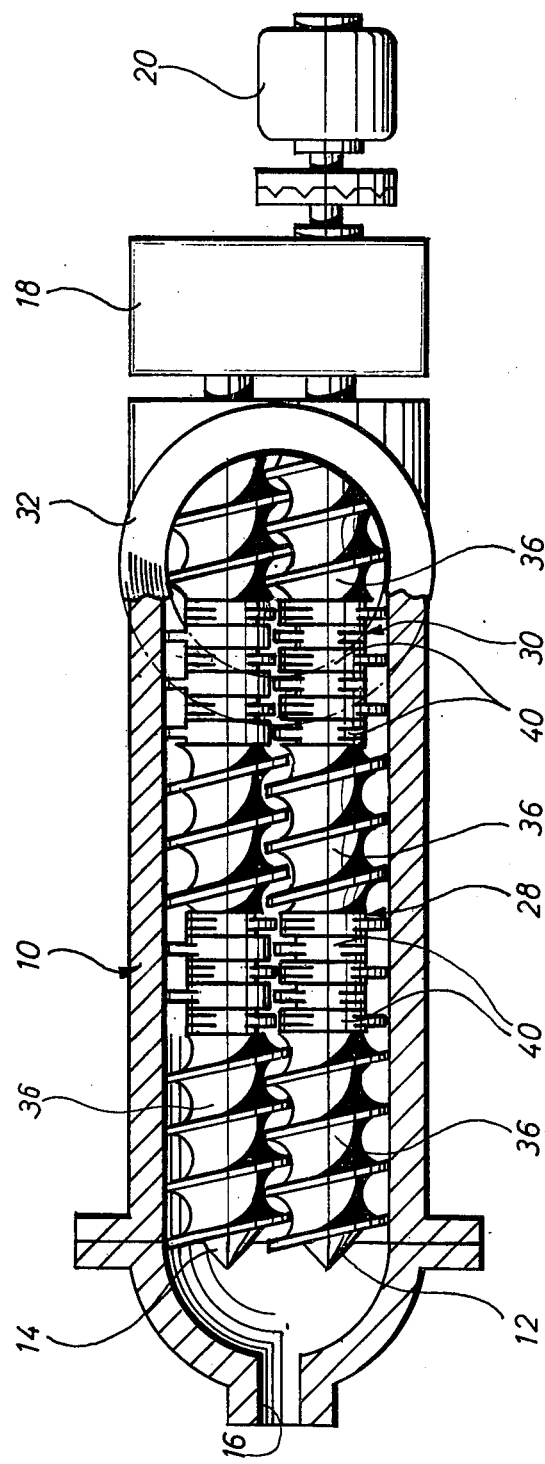
FIG. 1 is a plan view, partly in section of a screw machine comprising two screw shafts meshing with one another and designed in accordance with the invention.
Figure 2:
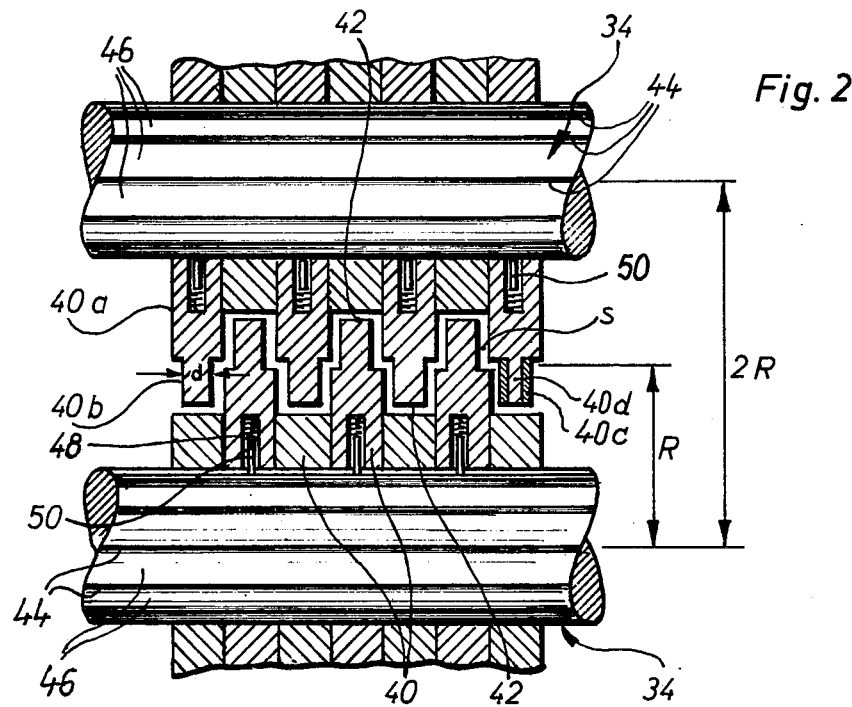
FIG. 2 is a sectional view of a larger scale than FIG. 1 of two sets of annular discs meshing with one another according to a first embodiment of the screw shafts.

FIG. 1 shows a machine housing of a two shaft screw machine designated as a whole as 10, wherein two screw shafts 12 and 14 meshing with one another are mounted. At one end the machine housing 10 has an outlet 16, while on the other side of the machine housing a gear 18 is mounted, by means of which with the assistance of a motor 20 the two screw shafts 12 and 14 are driven synchronously and e.g. in the same direction. Since the two screw shafts can be identical in design, the following description with the exception of FIG. 2 is limited to explaining the construction of one screw shaft, for example the screw shaft 12.

The latter is provided with three screw sections 36 and several sets 28 and 30 of annular discs 40, said sets of annular discs being mounted between screw sections. Above the screw sections 36 of the two screw shafts 12 and 14 the machine housing 10 is provided with a feed hopper 32 through which the material to be processed by the machine can be fed.

The above described is prior art and so a more detailed description does not prove necessary.

Figure 3:
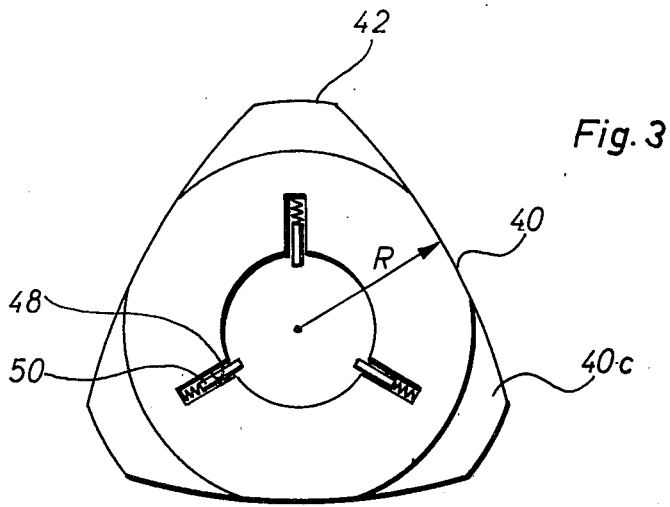
FIG. 3 is a side view of one of the annular discs shown in FIG. 2.
Figure 4B:
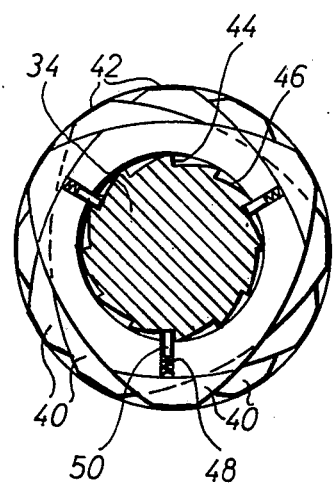

In the embodiment shown in FIG. 2 to 4b for any screw shaft 12, 14 a continuous core shaft 34 is provided, on which between the screw sections 36 (these were omitted in FIG. 2) the annular discs 40 are mounted in accordance with the invention, namely practically without any gap. The screw sections 36 are non-rotatably connected with the core shafts 34 in a known manner, while the annular discs 40 are carried along in accordance with the invention in the operational direction of rotation of the screw shafts in a form locking manner and can be rotated in the operational direction of rotation in the sense of a lead in relation to the core shaft. For this purpose the core shafts have at least in the area between the screw sections 36 the cross section shown in FIG. 4b with a saw tooth profile at the circumference. This saw tooth profile forms stop edges 44 lying in radial and longitudinal directions and abutting surfaces 46, which interact with stop bolts 50 which are sprung and held in radial bores 48 of the annular discs 40. Thus, if a core shaft 34 as shown in FIG. 4b rotates in a clockwise direction the annular discs 40 are always carried along. However, the latter can be rotated in a clockwise direction in relation to the core shaft without the core shaft having to be disassembled. Thus, the operational direction of rotation of the screw shaft corresponds to the clockwise direction as shown in FIG. 4b.

Figure 4A:
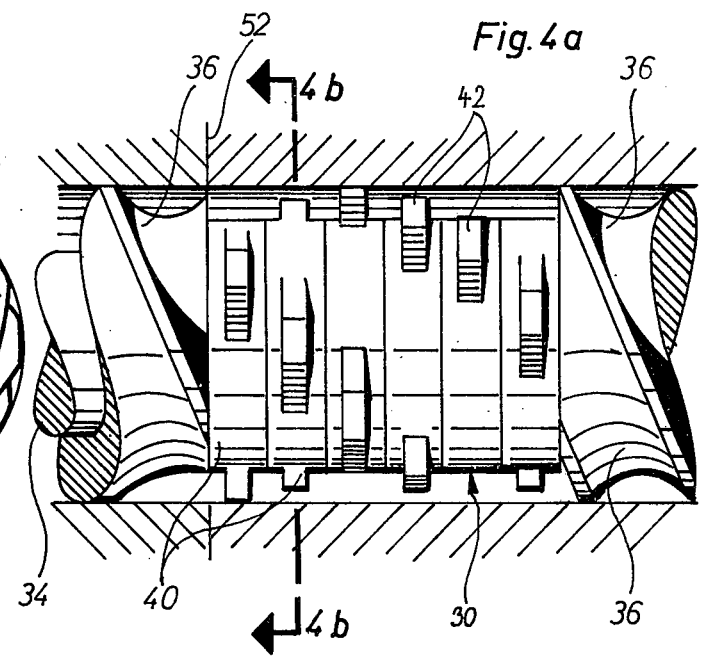
FIG. 4a is a complete side view of a part of one of the two screw shafts shown in FIG. 1 and 2 with a set of annular discs, but where the annular discs adapt other positions in relation to one another.

As FIG. 3 and 4b show, the annular discs 40 in this first embodiment have an approximately triangular shape, so that with the three crests 42 of these annular discs a triple-thread screw is approximated (see FIG. 4a and 4b). However, since the angle of displacement of the annular discs can be altered and adjusted relative to one another and in relation to the screw sections 36 of the screw shafts, the action of the screw shafts in the homogenizing zones formed by the sets of annular discs 28 and 30 can be adjusted sectionwise to various conveying rates and conveying directions. Thus, the duration of the stay of the material to be processed in the homogenizing zones and the energy which is introduced to the material per unit of time in these homogenizing zones can also be free selected at least within certain limits.

In order to be able to rotate the annular discs on the core shaft 34, in the embodiment shown in FIG. 2 to 4b the machine housing 10 should be divided at 52 and designed in such a way that at least one part of the housing can be pushed along the screw shafts in order to make the annular discs 40 accessible. The machine housing could, of course, also have a window in the area of the homogenizing zones.

As shown particularly in FIG. 2 the annular discs 40 are reduced at their endfaces 40a in the overlapping area—and in FIG. 2 they are mounted without angular displacement, i.e., their crests 42 align in the longitudinal direction of the core shafts 34. If one designates the axial distance between the core shafts 34 (the socalled practical axial distance) as 2R, then in the drawn, preferred embodiment of the invention those areas 40b of the annular discs which are of a distance $\geq$ R from the axis of the pertaining core shaft 34 are of decreased width. In this way one can—although the annular discs belonging to a set of annular discs 28, 30 are mounted alongside one another without a gap on the respective core shaft—prevent the meshing areas 40b of sets of annular discs located opposite one another from rubbing against one another as a result of uneven temperatures of the two screw shafts 12, 14, which up until now has always been avoided by means of intermediate discs or gaps between the annular discs. Since in the areas with a radius < R gaps are completely avoided and in the area $\geq$ R all surfaces of the meshing sets of annular discs are stripped again and again during the operation of the screw machine there are neither dead zones in and between the screw shafts nor an abutting of the intermediate annular discs against the annular discs of a screw shaft located opposite. Thus, owing to the non existence of dead zones plastics cannot be thermically damaged and there are no cleaning difficulties in the screw machine disclosed by the invention.

The width d of the annular disc areas 40b and thus the width of the gap s between the annular disc areas meshing with one another can now be freely selected. However, the energy introduced to the material to be processed in the homogenizing zones depends among other things on the width of these gaps. For this reason it is purposeful to form the areas 40b of the annular discs by means of exchangeable mounting elements or segments 40c, as it is shown on the far right annular disc in FIG. 2; these segments are plates whose shape is shown in FIG. 3 and which are attachable at a rib 40d of the annular disc, for example, by means of screws which are not shown.

For the embodiments of screw shafts for the machine disclosed by the invention as shown in FIG. 5a to 7b the same reference numerals were used as far as possible as in FIG. 1 to 4b and so only the differing features are described in the following.

Figure 5B:
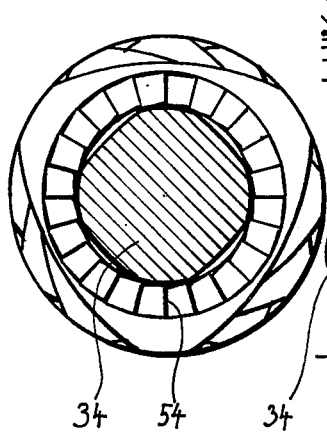
FIG. 5b is a section through the second embodiment corresponding to FIG. 4b.
Figure 5A:
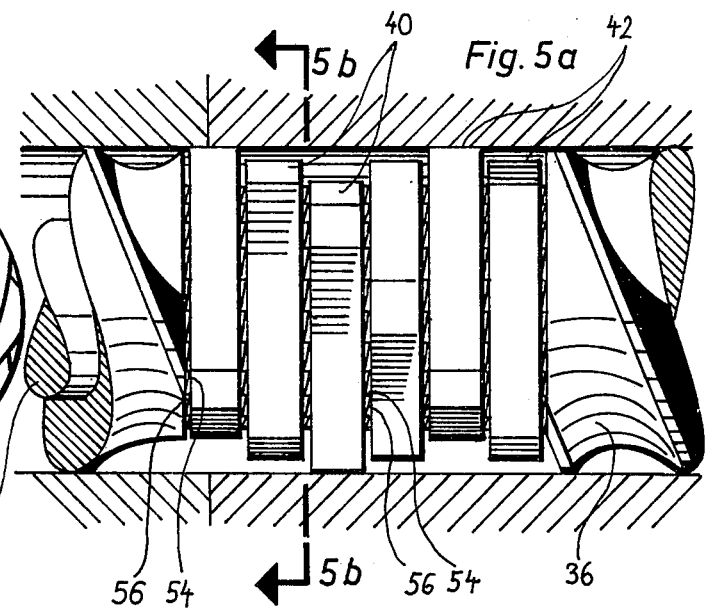

In the screw shaft embodiment shown in FIG. 5a and 5b the screw shaft 34 could have a circular cross section; however, since this is not necessary a cross section differing from the circular form and without notch effect was illustrated. As is shown particularly in FIG. 5a, the endfaces of the annular discs 40 have saw tooth profiles 54 and 56 which engage with one another, and also the endfaces of the screw sections 36 facing the set of annular discs illustrated have such saw tooth profiles 54 or 56 respectively. This results in a non-rotatable connection of the annular discs 40 with the screw sections 36 which are non-rotatably mounted on the screw shaft 34. Finally, at least one of these screw sections on the screw shaft 34 should be displaceable in an axial direction. As FIG. 5b shows, the annular discs 40 on the screw shaft can be freely rotated and displaced, if they are not clamped between the screw sections (by way of any suitable and well known means) and prevented from rotating by means of their saw tooth profiles 54 and 56. For instance a thread can be provided on the core shaft in a zone carrying the end of a screw section 36 not facing the set of discs 40, and a nut on this thread and abutting against this end would be sufficient to displace the screw section.

In this embodiment of the inventive machine the machine housing which is not illustrated should also be divided (as shown in FIG. 4a) and the parts of the housing should be adapted to be pulled apart, so that the sets of annular discs formed by the annular discs 40 are accessible. If one now displaces one of the the screw sections 36 on the core shaft 34 the angular positions of the annular discs 40 can be freely selected and fixed again by means of clamping the annular discs between the screw sections 36.

Figure 6B:
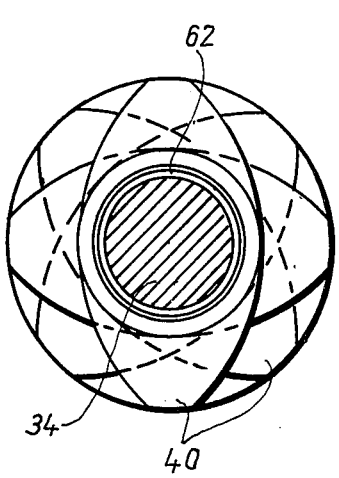
FIG. 6b is a section through this third embodiment corresponding to FIG. 4b.
Figure 6A:
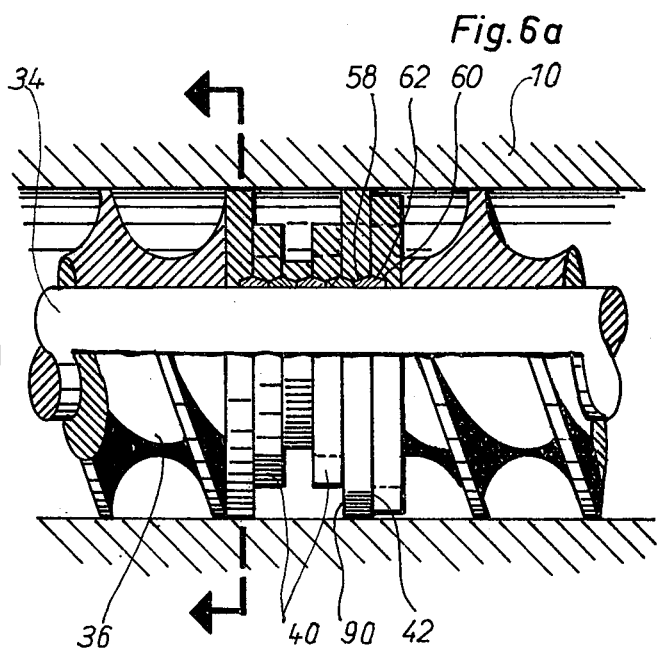
FIG. 6a is an illustration, partly in section, corresponding to FIG. 4a, of a third embodiment of a screw shaft.

In the third embodiment shown in FIG. 6a and 6b the annular discs 40 are provided on the inside with conical surfaces 58 and 60 opposed to one another and interacting with corresponding conical surfaces of annular clamping springs 62 which are likewise mounted on the core shaft 34. At least one of the screw sections 36 should as in the embodiment according to FIG. 5a and 5b be displacable along the core shaft 34 and be able to be pulled in a direction towards the set of annular rings formed by the annular discs 40, so that forces acting in an axial direction are exerted on the annular clamping springs 62 resulting in their radial expansion. Annular clamping springs are known per se and therefore require no further explanation. In order to complete the description it should be mentioned that during the clamping of the set of annular discs the screw sections 36 exert axial forces on the two outer annular discs, that the latter transfer the axial forces to the annular clamping springs surrounded by the annular discs and the annular clamping springs then transfer these axial forces to the adjacent annular discs etc. Thus, if at least one of the screw sections 36 is non-rotatably connected again with the core shaft 34, the clamped annular discs 40 are likewise non-rotatably coupled with the core shaft.

FIG. 6b also shows that the annular discs 40 can, for example, also have approximately the shape of spindles.

In the description of FIG. 5a to 6b it was mentioned that at least one of the screw sections 36 must be displacable in an axial direction on the core shaft 34, since only one set of annular discs is illustrated in each of these figures. If a screw shaft contains several sets of annular discs then with this type of securing the annular discs several or all the screw sections but one must, of course, be axially displacable.

Figure 7B:
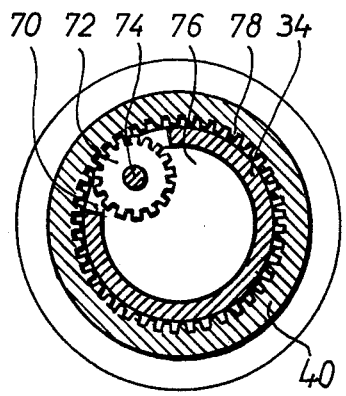
FIG. 7b is a section through the fourth embodiment corresponding to FIG. 4b.
Figure 7A:
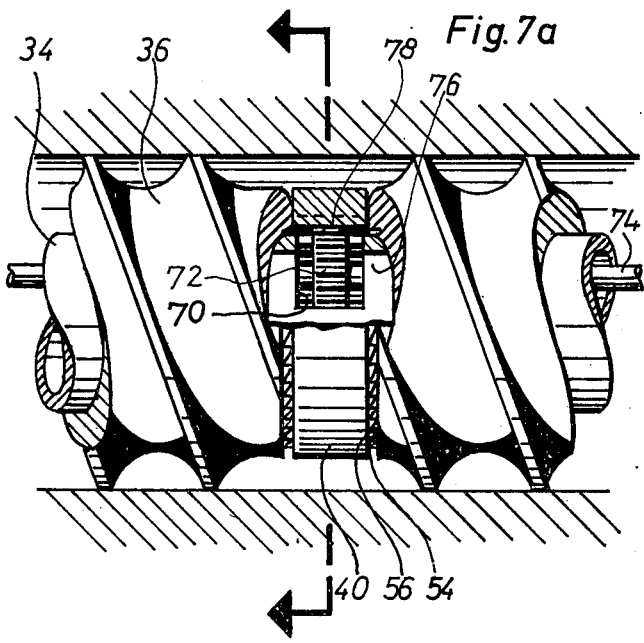
FIG. 7a is an illustration of a fourth embodiment of a screw shaft corresponding to FIG. 4a, wherein for reasons of simplicity only one single annular disc is shown.

FIG. 7a and 7b show an embodiment of a screw shaft with only one single annular disc 40, which is mounted on a hollow core shaft 34 between screw sections 36. The core shaft has a window 70 in which a pinion 72 is mounted. The latter is non-rotatably located on an axis 74 which proceeds to one end of the core shaft and extends in the latter's bore 76. The annular disc 40 has a corresponding internal toothing 78, with which the pinion 72 meshes. If the axis 74 can be fixed relative to the core shaft 34 then no further elements would be necessary in order to be able to adjust and lock the annular disc 40 relative to the core shaft. However, if the axis 74 and the pinion 72 are only for adjusting purposes then one can, for example, resort again to saw tooth profiles 54 and 56 as disclosed in FIG. 5a and 5b in order to lock the annular disc on the core shaft.

Figure 8B:
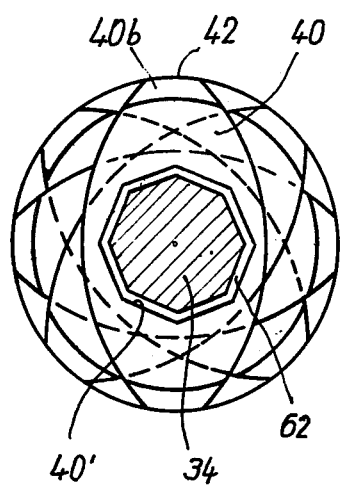
FIG. 8b is a section through this fifth embodiment corresponding to FIG. 4b.
Figure 8A:
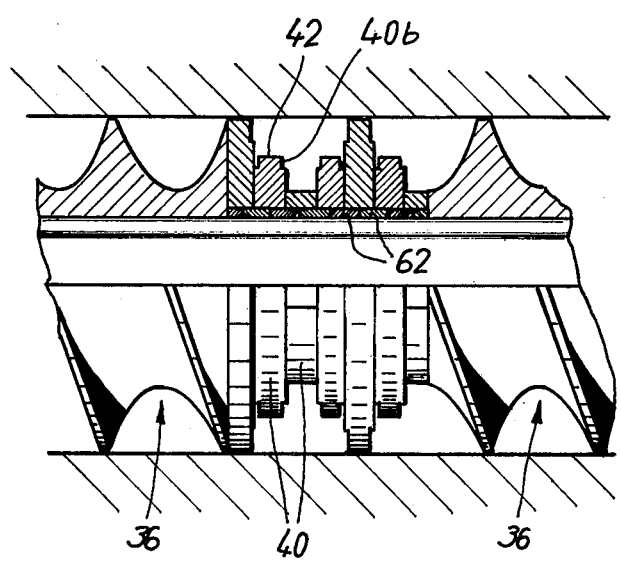

Finally, FIG. 8a and 8b show an embodiment similar to that illustrated in FIG. 6a and 6b. Here the core shaft 34 has a multi-cornered, for example, octagonal cross section with rings 62' mounted thereon between the screw sections 36 which rings are likewise octagonal in the cross section outside and inside, said rings therefore being non-rotatably arranged on the core shaft. They serve to connect in a form locking manner the core shaft and the annular discs 40, said annular discs having an octagonal opening 40' corresponding to the outer cross section of the rings 62'. In order to be able to alter the relative angular position of the annular discs 40 at least one of the screw sections 36 should on the other hand be displaceable along the core shaft 34 as in the embodiments shown in FIG. 5a, 5b and 6a, 6b, so that the annular discs can be removed from the rings 62 blocking them and rotated—an axial displacement of one of the screw sections enables gaps to be made between the rings 62 by displacing the latter and in these gaps the annular discs 40 can be free rotated owing to the smaller diameter of the core shaft 34. It is particularly advantageous if the rings 62—as illustrated—each engage in the openings 40' of two adjacent annular discs 40, so that the torque is not only transferred via the core shaft, but also by the rings 62 from annular disc to annular disc.

In the embodiment shown in FIG. 8a and 8b the screw sections 36 must only be adapted to be fixed in an axial direction, they do not have to be able to be tightened in this direction as is the case in the embodiments shown in FIG. 5a, 5b and 6a, 6b. It should also be mentioned that the rings 62 may also be conical. Furthermore, the circumference and correspondingly the openings 40' could be designed differently, e.g., with a toothing, since it is only a matter of on the one hand having a form locking connection and on the other hand guaranteeing the rotatability of the annular discs 40.

Making the annular discs narrower in the overlapping area than in the inner area in order to avoid various intermediate discs and dead zones between the annular discs is, of course, also advantageous in screw shafts where the annular discs must be removed from the core shaft in order to alter their angular positions.

I claim:
1. Screw machine for homogenizing solid, liquid and viscous material, having at least two screw shafts engaging with one another and rotatable in an operational direction, each of which comprises a screw section, a core shaft section, and an annular disc on said core shaft section, the shape of the annular disc differing from a circular cylinder concentric to the shaft axis, said annular disc being rotatable relative to the core shaft section in at least the operational direction of rotation of the respective screw shaft to adjust the angular position of said annular disc relative to the respective core shaft, and means for coupling said annular disc with the core shaft section rotating in said operational direction of rotation, said annular discs of the screw shafts engaging with one another and overlapping one another in radial direction, and having peripheral zones of reduced width in the overlapping region.

2. Screw machine as set forth in claim 1, wherein from a diameter which is slightly smaller than the distance of the axes of the two engaging screw shafts onwards the annular discs are of reduced width.

3. Screw machine as set forth in claim 1 wherein the annular discs are provided with shoulders on both sides for the purpose of reducing the width in the peripheral zones.

4. Screw machine as set forth in claim 1 wherein the peripheral zones of reduced width are formed by exchangeable parts.

5. Screw machine as set forth in claim 1 having several annular discs mounted alongside one another on the core shaft section, wherein all annular discs on the core shaft section are rotatable relative to the latter and to one another.

6. Screw machine as set forth in claim 1, wherein said coupling means comprises several longitudinally extending notches distributed over the circumference of said core shaft section and at least one radially movable stop element mounted in said annular disc and adapted to engage one of said notches.

7. Screw machine as set forth in claim 6, wherein the core shaft section is provided with a saw tooth profile along its circumference.

8. Screw machine as set forth in claim 1, wherein said coupling means comprises the annular disc being clamped in axial direction between adjacent parts of the screw shaft and at least its one endface and the adjacent endface of the adjoining part having a profile.

9. Screw machine as set forth in claim 8 wherein said profile extends in a radial direction.

10. Screw machine as set forth in claim 1, wherein said coupling means comprises an annular clamping spring which mounts said annular disc and can be clamped in an axial direction between parts which are mounted at the screw shaft.

11. Screw machine as set forth in claim 10 wherein said parts are non-rotatably mounted at the screw shaft.

12. Screw machine as set forth in claim 1, wherein said coupling means comprises the core shaft section being hollow and having a window through which an adjustable pinion engaging with an internal toothing of the annular disc projects.

13. Screw machine as set forth in claim 12 wherein said pinion is lockable.

14. Screw machine as set forth in claim 1, having several annular discs mounted alongside one another on the core shaft section, and wherein said coupling means comprises several rings mounted on the core shaft section which are non-rotatably connected with the latter and are displaceable thereon in an axial direction, said rings having on the outside a substantially polygonal cross-section designed in such a way that annular discs which are provided with a polygonal opening of corresponding shape can be slid onto the rings in several angular positions, and in that rings and annular discs are mounted between parts of the screw shaft, at least one of which parts can be displaced in an axial direction.

15. Screw machine as set forth in claim 1 wherein the annular disc is shaped as a screw segment.

* * * * *